Figure 1:
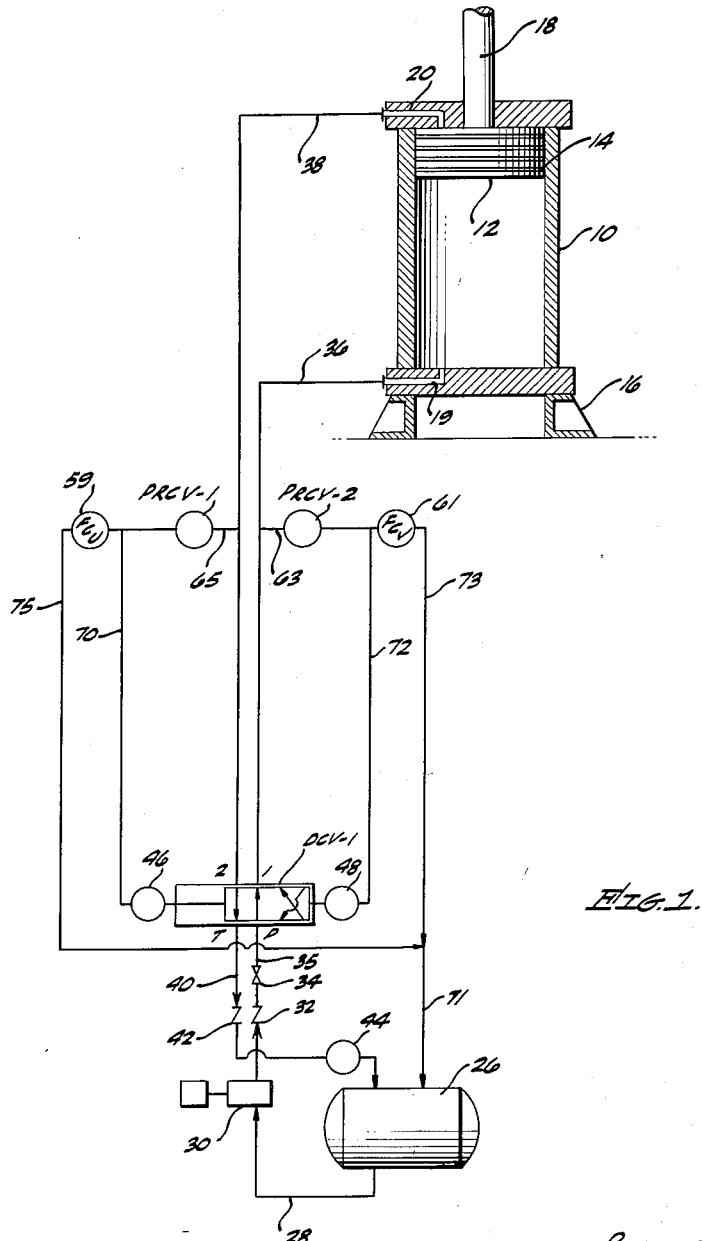

June 13, 1961 R. F. DEERING ET AL 2,987,886
APPARATUS FOR VALVE SEQUENCE OPERATION
Filed Sept. 2, 1958 3 Sheets-Sheet 1

INVENTORS.
ROLAND F. DEERING.
HERBERT F. WILKINSON,
By Richard C. Wortman
ATTORNEY.

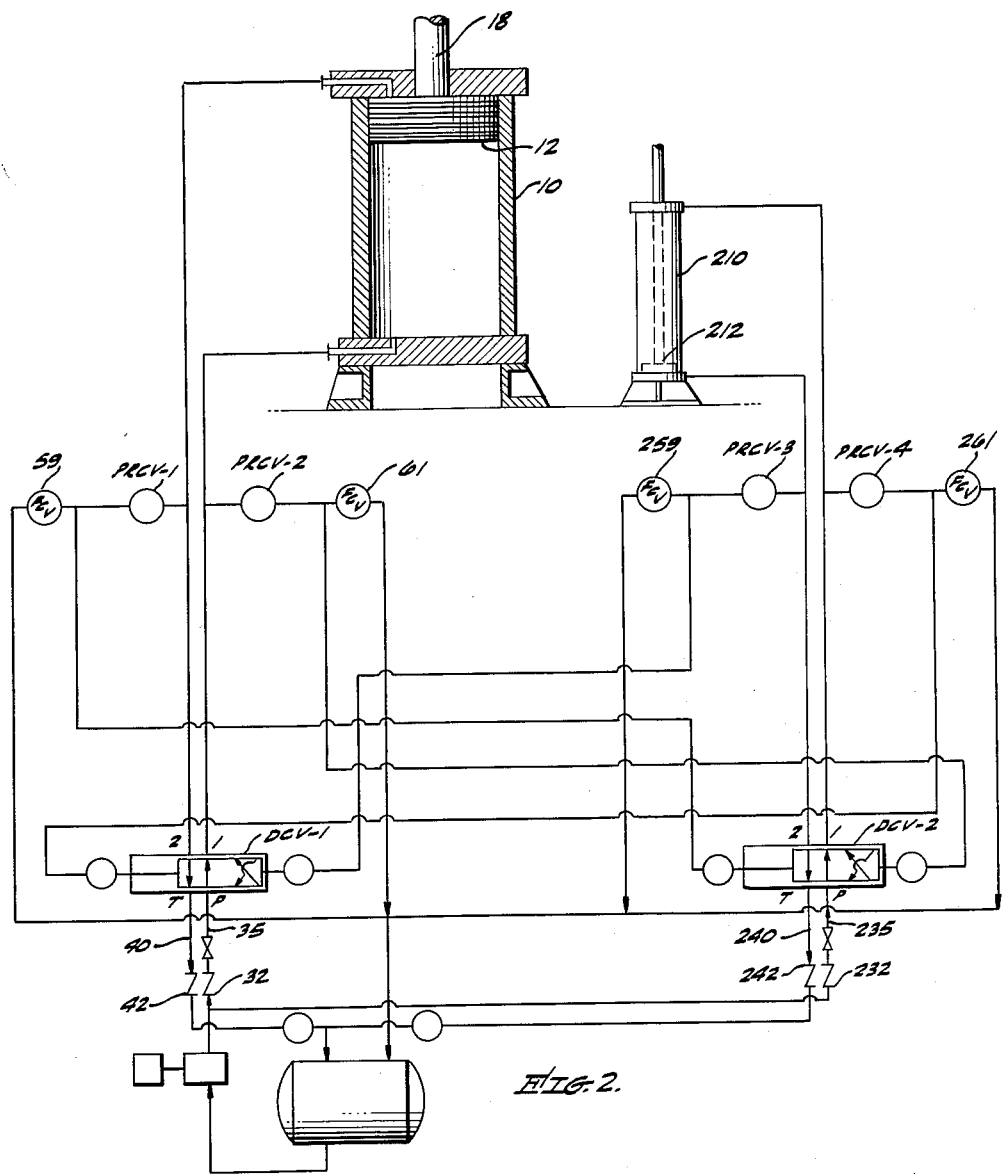

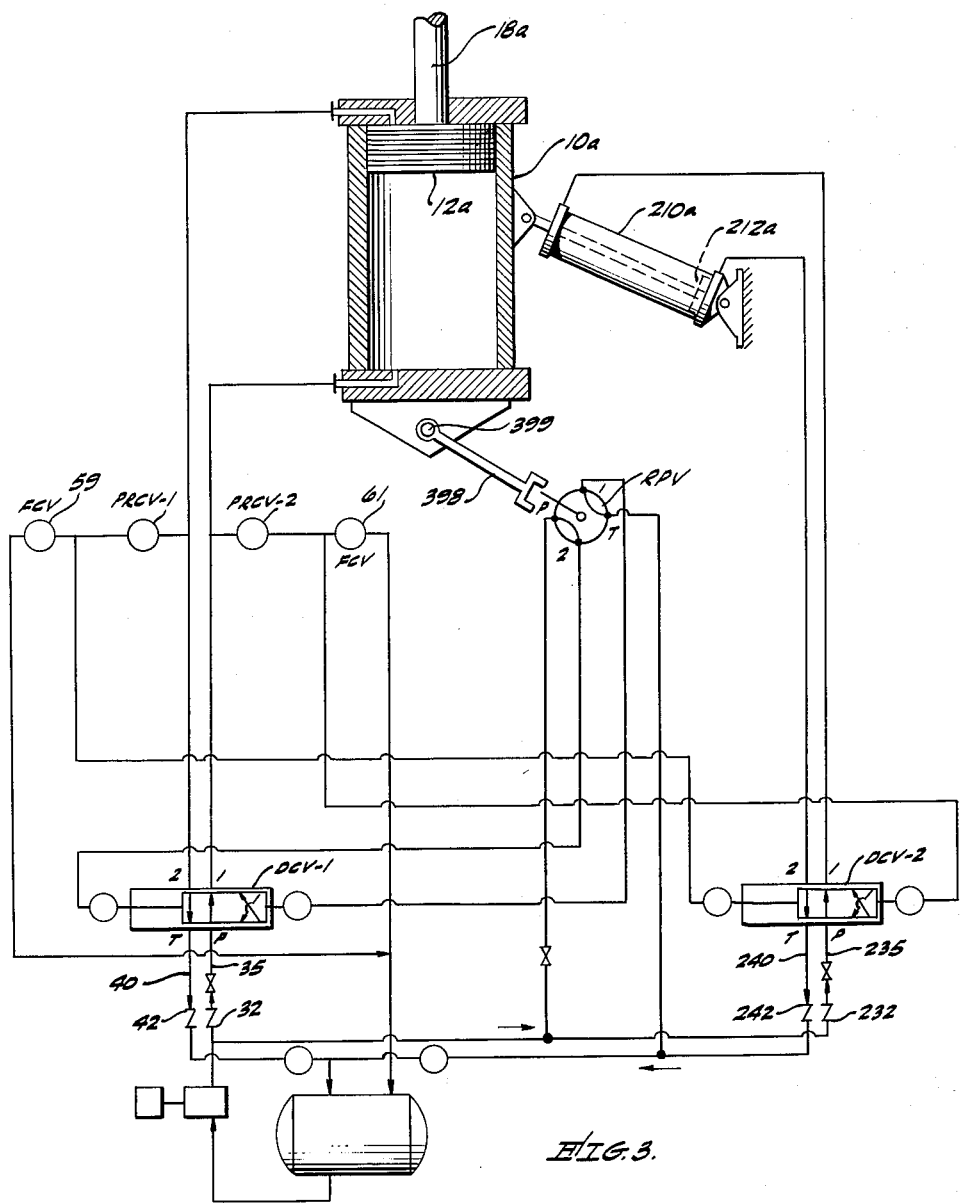

United States Patent Office 2,987,886
Patented June 13, 1961

2,987,886
APPARATUS FOR VALVE SEQUENCE OPERATION
Roland F. Deering, Brea, and Herbert F. Wilkinson, Fullerton, Calif., assignors to Union Oil Company of California, Los Angeles, Calif., a corporation of California
Filed Sept. 2, 1958, Ser. No. 758,394
1 Claim. (Cl. 60—52)

This invention relates to automatic control of a hydraulically and reversibly operable device. More particularly, it involves one or more reciprocating pistons in their respective cylinders and apparatus for automatic operation of a reversing valve for each piston in response to a change in the pressure of the hydraulic fluid supply line.

It is an object of the invention to provide for a hydraulically operated piston which is automatically controlled by an unusual application of conventional reversing valve equipment arranged for maintenance purposes in easily accessible locations which may be remote from the piston.

The invention is based on the fact that when a hydraulically operated piston reaches the end of its stroke, the pressure of the hydraulic fluid in the line acting as the supply line will rise from normal operating pressure to the maximum pressure of the supply pump (assuming no leakage). This rise in pressure causes a spring-loaded pressure relief valve to operate which by-passes the high pressure fluid to a reversing valve, which reverses the hydraulic fluid flow, causing the piston to be driven in the opposite direction. At the other end of the piston stroke, another relief valve in a second line acting as the supply line will rise in pressure and restore the reversing valve to its original position. Similarly, two or more pistons may be operated in series.

The invention and a particular application thereof to a reciprocal pump for feeding solids through an up-flow oil shale retort will be more easily understood from the following description and accompanying drawings of which:

FIGURE 1 shows a schematic piping and instrumentation diagram of a hydraulic system employing the invention to reciprocate a single piston, FIGURE 2 shows a schematic piping and instrumentation diagram employing the invention to alternately operate two unconnected or connected pistons, and FIGURE 3 shows a schematic piping and instrumentation diagram like FIGURE 2, except that the two pistons are interconnected, and part of the sequence is mechanically controlled.

Referring now particularly to FIGURE 1, hydraulic cylinder 10, provided with piston 12 and having substantially fluid tight piston rings 14, is fixedly mounted by means of support 16 and connected to a suitable reciprocating load, not shown, by means of piston rod 18. Cylinder 10 is provided with conventional end connections 19 and 20 for hydraulic fluid. Hydraulic fluid from oil reservoir 26 flows through outlet line 28 into oil pump 30. Oil is pumped therefrom through check valve 32, on through rate control valve 34 and supply line 35 into a four-way directional control valve DCV–1 having ports P, T, 1 and 2. The high pressure oil opens thereinto through port P and the vented oil flows from port T through vent line 40 provided with check valve 42 back to reservoir 26 through filter and cooler 44. Port 1 of valve DCV–1 is connected by means of first operating line 36 to lower hydraulic oil connection 19, and upper hydraulic oil connection 20 communicates through second operating line 38 to port 2. With directional control valve DCV–1 in the position shown, high pressure oil is supplied through operating line 36 to the bottom of cylinder 10, moving piston 12 upwardly therein. When piston 12 reaches the end of its stroke upward, the pressure of the hydraulic oil in line 36 tends to build up to the maximum pressure of pump 30. First pressure relief control valve PRCV–2, which is spring-loaded so as to open only when the pressure approaches this maximum, is opened by this fluid pressure in line 36 and the pressure impulse therefrom is transmitted by way of first by-pass line 63 and first reversing line 72 to first operator 48 which moves DCV–1 to the left. With DCV–1 moved to the left, the hydraulic oil from supply line 35 passes through DCV–1 between ports P and 2 and through second operating line 38, to the top connection 20 of cylinder 10 causing piston 12 to lower; and the hydraulic oil displaced from the lower end of cylinder 10 passes through line 36 and through DCV–1 between ports 1 and T back to vent line 40.

Similarly, at the bottom of the downward piston stroke, the pressure builds up in second operating line 38, spring-loaded second pressure relief control valve PRCV–1 is temporarily opened by the excessive fluid pressure, the pressure impulse therefrom is transmitted by way of second by-pass line 65 and second reversing line 70 to second operator 46 which moves valve DCV–1 to the right, and the cycle is repeated. The system continues in this reciprocating motion indefinitely at a rate controlled by valve 34 and pump 30 which regulate the rate at which high pressure fluid is supplied to cylinder 10 to move piston 12. Directional control valve DCV–1 thus selects the hydraulic oil connection of cylinder 10 to which high pressure oil is supplied and this determines the direction of movement of piston 12. DCV–1 is moved from left to right and right to left by means of hydraulic operators 46 and 48, respectively. These operators are in turn actuated by hydraulic pressure impulse from their respective pressure relief control valves PRCV–1 and PRCV–2.

As indicated above, pressure relief control valves PRCV–1 and PRCV–2 in by-pass lines 65 and 63, respectively, are spring-loaded by means of springs normally biasing them into closed positions. By-pass lines 65 and 63 connect operating lines 38 and 36, respectively, with lines 70 and 75, and 72 and 73, respectively. Thus the relief valves alternately release a fluid pressure impulse through reversing lines 70 and 72, respectively, to hydraulic operators 46 and 48, respectively, to actuate directional control valve DCV–1 in response to excessive pressure increase in respective operating lines 38 and 36. For the purpose of relieving this pressure when the relief valves close, flow control valves 59 and 61 are provided in vent lines 73 and 75, respectively. These vent lines 73 and 75 may be connected by way of vent manifold 71 to reservoir 26 directly as illustrated, or to vent line 40, or to a discard.

The pressure relief control valve PRCV–2, when it opens, permits hydraulic fluid to flow at an established rate depending on its setting, or the flow capacity (at operating pressure) of this valve and its line 63. This flow capacity should be only a small fraction of the main flow through the operating lines 38 and 36. The flow control valve 61, downstream of the pressure relief valve PRCV–2, is set to take only a portion of the flow caapcity of the pressure relief control valve such that the main portion of the initial flow, which passes into reversing line 72, is sufficient to operate valve DCV–1. Thus, for example, where the flow capacity of this relief valve and its by-pass line may be 5 gallons per minute (g.p.m.) for an operating flow of 200 g.p.m. through the operating line 36, the flow capacity of the valve 61 may be set at only 1 g.p.m., so that when PRCV–2 first opens, the flow will momentarily be about 4 g.p.m. and 1 g.p.m., respectively, through lines 72 and 73. As soon as DCV-1 is moved, the excessive pressure in line 36 is relieved. The pressure relief control valve PRCV-2 then closes and fluid pressure downstream thereof is released via the flow control valve 61 by way of the vent line 73 and manifold line 71 to reservoir 26. Analogous considerations apply to PRCV-1, by-pass lines 65, flow control valve 59, vent line 75, reversing line 70 and operator 46, for valve DCV-1. The pressure at which PRCV-1 and PRCV-2 open and close should be substantially higher than the normal working pressure while piston 12 is traveling; but should be sufficiently below the maximum pressure of pump 30 to compensate for leaks in the system or other conditions which might prevent the pressure at these valves from attaining the maximum pump pressure when piston 12 is at the end of its stroke. Typically, supply line 35 pressure to cylinder 10 may be 25% of maximum pump pressure, exhaust line 40 pressure may be 20% of maximum pump pressure, and opening pressure for the pressure relief control valves may be 97.5% of pump pressure. Lower limits of practical pump pressure will of course be limited by fluid friction and operating characteristics of the hydraulic elements employed. Maximum pump pressures will ordinarily be chosen as high as 1,000 p.s.i. or higher.

The apparatus disclosed above is adapted to any use in which automatically controlled reciprocal motion is required, and in which the automatic controlling system for such control of the reciprocation is desirably remotely located from the reciprocating member which times the occurrence of the controlling pressure signal. Such uses, in particular, are those in which reciprocating pistons are inaccessible for maintenance purposes such as for a bottom hole pump in a well, or with crowded, compact and relatively inaccessible reciprocating machines such as a solids pump for an upwardly feeding oil shale retort, and the like.

FIGURE 2 shows an application of the principle of the invention to control two pistons 12 and 212 to operate in sequence in cylinders 10 and 210, respectively. This uses an additional four-way reversing valve DCV-2 similar to DCV-1; a fluid supply line 235 and exhaust line 240; flow control valves 259 and 261; and pressure relief control valves PRCV-3 and PRCV-4 in the respective operating lines to cylinder 210. The latter relief valves operate at each end of the stroke of piston 212 so as to operate reversing valve DCV-1 in the operating lines to cylinder 10, while PRCV-1 and PRCV-2 operate at each end of the stroke of piston 12 so as to operate reversing valve DCV-2. The operation is similar to FIGURE 1 apparatus operation with the sole exception that the rise in pressure at the end of the stroke of the first piston 12 reverses the direction of the second piston 212, which in turn reverses the direction of the first piston 12 by the rise in pressure at the end of its (the second piston's) stroke. Similarly, additional pistons may each be successively operated first in one direction, then in the other.

FIGURE 3 shows another application of the principle of the invention to sequential operation of two pistons. The basic difference between the apparatus of FIGURE 3 and the apparatus of FIGURE 2 is that the two cylinders 10a and piston 212a are mechanically connected so that movement of piston 212a moves cylinder 10a, and control of DCV-1 is accomplished by mechanical actuation of rotary pilot valve RPV in response to the movement of piston 212a. In FIGURE 3 piston 212a is pivotally affixed to pivotally mounted cylinder 10a which is rotated counterclockwise, from its vertical position shown, by extension of piston 212a. Movement of cylinder 10a from vertical causes a kicker rod 398 attached to pivot shaft 399 to reverse rotary pilot valve RPV which controls DCV-1.

The apparatus as shown in the three embodiments of FIGURES 1, 2 and 3 will be best understood by reference to the more complete discussion of the FIGURE 1 apparatus and by reference to the simplified description of sequence of operation for the respective apparatus of FIGURES 1, 2 and 3 which follows in tabular form.

*Sequence of operation to reach final conditions shown in FIGURES 1, 2 and 3*

[Definitions: SP designates pistons 212 and 212a. LP designates pistons 12 and 12a]

| Figure 1 Sequence | Figure 2 Sequence | Figure 3 Sequence |
| --- | --- | --- |
| 1. PRCV-2 pops open. | 1. PRCV-2 pops open. | 1. PRCV-2 pops open. |
| 2. DCV-1 moves to left. | 2. DCV-2 moves to left. | 2. DCV-2 moves to left. |
| 3. LP moves downward.* | 3. SP moves upward.* | 3. SP moves to extend its rod.* |
| 4. LP reaches bottom dead end. | 4. SP reaches top dead end. | 4. SP reaches top dead end. |
| 5. PRCV-1 pops open. | 5. PRCV-3 pops open. | 5. RPV rotates P to 1. |
| 6. DCV-1 moves to right. | 6. DCV-1 moves to left. | 6. DCV-1 moves to left. |
| 7. LP moves upward.* | 7. LP moves downward.* | 7. LP moves downward.* |
| 8. LP reaches top dead end. | 8. LP reaches bottom dead end. | 8. LP reaches bottom dead end. |
| 9. Repeat 1. | 9. PRCV-1 pops open. | 9. PRCV-1 pops open. |
|  | 10. DCV-2 moves to right. | 10. DCV-2 moves to right. |
|  | 11. SP moves downward.* | 11. SP moves to withdraw its rod.* |
|  | 12. SP reaches bottom dead end. | 12. SP reaches bottom dead end. |
|  | 13. PRCV-4 pops open. | 13. RPV rotates P to 2. |
|  | 14. DCV-1 moves to right. | 14. DCV-1 moves to right. |
|  | 15. LP moves upward.* | 15. LP moves upward.* |
|  | 16. LP reaches top dead end. | 16. LP reaches top dead end. |
|  | 17. Repeat 1. | 17. Repeat 1. |

*Piston movement steps of the respective sequences.

The apparatus of FIGURE 1 may be applied to automatic control of reciprocation of a working piston within a cylinder remotely located, for example, a pump at a well bottom. All control equipment may be located at the well top remote from the pump and working piston.

The apparatus and arrangement of standard equipment shown in FIGURE 2 may be applied to automatic intercontrol of the sequence of two remotely located reciprocating piston fluid machines inter-connected only by fluid pressure lines.

The apparatus and arrangement of standard equipment shown in FIGURE 3 is an example of sequence intercontrol of two reciprocating piston members useful, for example, in an oil shale retort which feeds solids upwardly as described in Berg 2,501,153; Berg 2,640,019 and the copending application of Lieffers and Switzer, Serial Number 542,284 filed October 24, 1955, now U.S.

Patent No. 2,875,137. In such a retort a hydraulic piston such as 12a may be used to drive a feeder piston operating in a feeder cylinder which is connected to and coaxial with cylinder 10a. Thus, upward movement of 12a forces a shale charge upward from the feeder cylinder into the retort when 12a is in a vertical position. After piston 212a has tipped cylinder 10a and the feeder cylinder to the left, piston 12a and the feeder piston lower to take a new shale charge supported in the feeder cylinder by the feeder piston and rod 18a; piston 212a then returns cylinder 10a and the feeder cylinder to the vertical position; piston 12a forces the new shale charge upwardly into the retort; and the cycle is repeated at a rate which may be readily controlled by adjustment of the valves in lines 35 and 235.

The advantages disclosed in the drawings and specification of the invention comprise: adaptability of the invention to use of standardized parts, savings in maintenance costs and original cost of the parts used over other standard control systems, reliability of operation of the system and its standard parts, and provision by the invention for simplified form of remote sequence control of reciprocating piston members.

It is to be understood that the above embodiments of the invention and the uses disclosed herein are illustrative only, and that the invention is not to be limited except in accordance with the following claim which defines the limits thereof.

We claim:

An apparatus for hydraulically operating a primary piston contained in a primary cylinder, said apparatus comprising: a first operating line and a second operating line respectively connected to opposite ends of said primary cylinder; a pump, the inlet of which is connected to a hydraulic fluid reservoir; a primary flow reversing valve for alternately connecting the outlet of said pump to said first and said second operating lines and simultaneously alternately connecting said reservoir to said second and said first operating lines, respectively; a first bypass line connected at one end to said first operating line and at the other end to a first vent line and a first reversing line; a second bypass line connected at one end to said second operating line and at the other end to a second vent line and to a second reversing line; operating means for said primary flow reversing valve connected to each of said reversing lines, said operating means connected to said primary flow reversing valve, and said operating means for said primary flow reversing valve comprising: a secondary piston contained in a secondary cylinder; a third operating line and a fourth operating line respectively connected to opposite ends of said secondary cylinder; a secondary flow reversing valve for alternately connecting the outlet of said pump to said third and said fourth operating lines and simultaneously alternately connecting said reservoir to said fourth and said third operating lines, respectively; operating means for said secondary flow reversing valve connected to said first reversing line and said second reversing line, said operating means connected to said secondary reversing valve so that at pressures approaching the maximum pump pressure in said first and said second reversing lines said operating means for said secondary flow reversing valve operate and thereby alternately reverse fluid pressure on said secondary piston; and motive means actuated by said secondary piston and connected to said primary flow reversing valve for operating said primary flow reversing valve when said secondary piston reaches the end of its stroke, thereby operating said primary piston and said secondary piston in series, said motive means comprising: actuating means for said primary flow reversing valve connected to said primary flow reversing valve and connected to a fifth operating line and a sixth operating line; a four-way rotary pilot valve alternately connecting said pump and said reservoir to said fifth and said sixth operating lines, respectively, said rotary valve being operated by the stroke of said secondary piston so that at each end of the stroke of said secondary piston the fluid pressure on said primary piston is reversed; a relief valve in each of said first and said second bypass lines, said relief valves being set to close at pressures not substantially greater than normal operating pressures and to open at pressures approaching maximum pump pressure; and a flow control valve in each of said vent lines, said flow control valves being set to limit the fluid flow therethrough sufficiently to create a sufficient pressure in said reversing lines to operate said operating means for said primary flow reversing valve and thereby alternately reverse fluid pressure on said primary piston.

References Cited in the file of this patent

UNITED STATES PATENTS

| | | |
|---|---|---|
| 1,943,061 | Douglas | Jan. 9, 1934 |
| 1,952,690 | Strom | Mar. 27, 1934 |
| 2,342,450 | Campbell | Feb. 22, 1944 |
| 2,617,257 | Douglas | Nov. 11, 1952 |
| 2,698,517 | Witt | Jan. 4, 1955 |
| 2,917,029 | Switzer | Dec. 15, 1959 |